US 7,516,981 B2
Apr. 14, 2009

(12) United States Patent
Hollo et al.

(54) DOOR MOUNTED VEHICLE SENSOR

(75) Inventors: Jeremy K. Hollo, Redford, MI (US);
Scott Kerby, Wolverine Lake, MI (US);
Richard W. Smith, Dearborn, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 11/705,148

(22) Filed: Feb. 12, 2007

(65) Prior Publication Data

US 2007/0210566 A1   Sep. 13, 2007

Related U.S. Application Data

(63) Continuation of application No. 11/276,609, filed on Mar. 7, 2006, now abandoned.

(51) Int. Cl.
*B60R 21/01* (2006.01)
(52) U.S. Cl. ....................... 280/735; 180/274
(58) Field of Classification Search .................. 280/735, 280/730.2; 180/274
See application file for complete search history.

(56) References Cited

U.S. PATENT DOCUMENTS

| 5,580,084 | A | * | 12/1996 | Gioutsos | 280/735 |
| 5,767,766 | A | * | 6/1998 | Kwun | 340/436 |
| 6,276,434 | B1 | | 8/2001 | Kono | |
| 6,392,542 | B1 | | 5/2002 | Stanley | |
| 6,407,660 | B1 | | 6/2002 | Bomya | |
| 6,433,688 | B1 | * | 8/2002 | Bomya | 340/573.1 |
| 6,951,238 | B2 | | 10/2005 | Hirai et al. | |
| 6,976,705 | B2 | | 12/2005 | Klaiber et al. | |
| 2007/0023224 | A1 | * | 2/2007 | Aoki et al. | 180/274 |

FOREIGN PATENT DOCUMENTS

| DE | 42 40 399 A1 | 6/1994 |
| EP | 0 775 613 A2 | 5/1997 |
| FR | 2 825 055 A1 | 11/2002 |
| GB | 2 353 362 A | 2/2001 |

* cited by examiner

*Primary Examiner*—Ruth Ilan
(74) *Attorney, Agent, or Firm*—Foley & Lardner LLP

(57) ABSTRACT

A vehicle safety system including a vehicle sensor component integrated into a portion of a vehicle door. A sensing portion may be integrated into a door module. A controller is coupled to the sensor and configured to activate a protective device when required.

11 Claims, 6 Drawing Sheets

DOOR MOUNTED VEHICLE SENSOR

This application is a continuation of U.S. application Ser. No. 11/276,609, filed Mar. 7, 2006, which is incorporated herein by reference.

BACKGROUND

The present invention is directed at a system and method for packaging a sensor for a vehicle safety system into a vehicle structure. In particular, for placing a sensor in a location in the side of the vehicle such as, for example, the vehicle door.

Conventional vehicle safety systems include those systems that are configured to protect vehicle occupants against collision with certain structural components of the vehicle (such as a lateral wall or window pane). Safety systems typically include a sensor configured to sense certain vehicle characteristics. The sensor output may be provided to a controller, processor or circuit which is configured to control the activation of certain safety devices such as, for example, an airbag. Sensors have included potentiometers, accelerometers, strain gauges, Hall effect sensors coupled to a magnetic circuit, and so forth.

The sensor may be mounted in a vehicle door or behind another vehicle-exterior panel. Most vehicle doors include an interior portion and an exterior portion. The exterior portion is a part of the outer shell of the vehicle and is usually composed of sheet metal (or other ferrous or electrical conducting material). The interior portion is configured to include various user controls and other vehicle features. The present application discloses means to mount various types of sensors within the door of a vehicle using suitably designed door modules, thereby making possible an improved side-impact vehicle safety system and simplifying door assembly by reducing the number of subassemblies being installed.

A sensor may be attached to the door module via various types of fasteners which can include serrated fasteners (e.g., "tree fasteners"), threaded fasteners, rivets, and the like. The sensors may be placed in various locations in the vehicle in order to obtain reliable measurements that may be used to control the activation of a vehicle safety device. In the past, manual assembly has been required to attach these sensors with respect to the vehicle door. Moreover, the structural rigidity of the attachment of the attachment of the sensor to the door module of the vehicle door is limited by the robustness of the fastener utilized. Therefore, the quality of the fastener (and associated costs) can significantly influence the reliability of the sensor mounting and overall manufacturing costs of the passenger safety device.

There is a general need for an improved structure and arrangement for mounting of a sensor in a vehicle door.

SUMMARY

One embodiment of the present vehicle safety system comprises a door including a door module and a sensor having a sensing portion configured to detect a predetermined condition. The sensing portion is integrated into the door module and the sensing portion is electrically insulated with respect to the vehicle door. A controller is connected to receive a signal from the sensor and configured to activate a protective device when a measurement of the signal received from the sensor indicates the occurrence of a predetermined condition.

One embodiment of the present vehicle safety system comprises a door including a door module having one or more sensing portion molded within the door module. The sensing portion could consist of a coil suitable to produce a magnetic field that encompasses other door components, such as the conductive and/or ferromagnetic surface of the exterior door panel. The sensing portion could also consist of an electrode suitable to emit or sense an electric field within the region of the door.

Another embodiment of the present vehicle safety system comprises a door including a door module that contains molded-in fasteners or fastener receptacles that provide for the simple attachment of other types of sensor elements that could detect crashes, such as accelerometers, for example.

The door module may be configured to provide for other hardware contained within the door assembly, and may include mounting bosses and/or fastener provisions to ensure a firm mechanical coupling between the door structure and the sensor elements molded into or attached to the door assembly.

It is understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

A door module may be mounted between the interior and exterior portions of the door and may support, separate, and/or guide various components placed in the door. These components may include electronic wiring, and other electronic devices. The door module may be formed of a polymer material and may be die cast, injection molded, stamped or manufactured from any other comparable processes. The door module may be fixed relative to the exterior portion of the door to thereby define two cavities within the door. The two cavities may be referred to as a controlled cavity and an uncontrolled cavity. The uncontrolled cavity rests between the exterior portion of the door and the door module and is popularly coined the "wet side" of the door. The controlled cavity is defined between the door module and the interior portion of the door. Such area is typically referred to as the "dry side" of the door, because the cavity is significantly less exposed to moisture and other contaminates than the uncontrolled cavity of the door.

Figure 1:
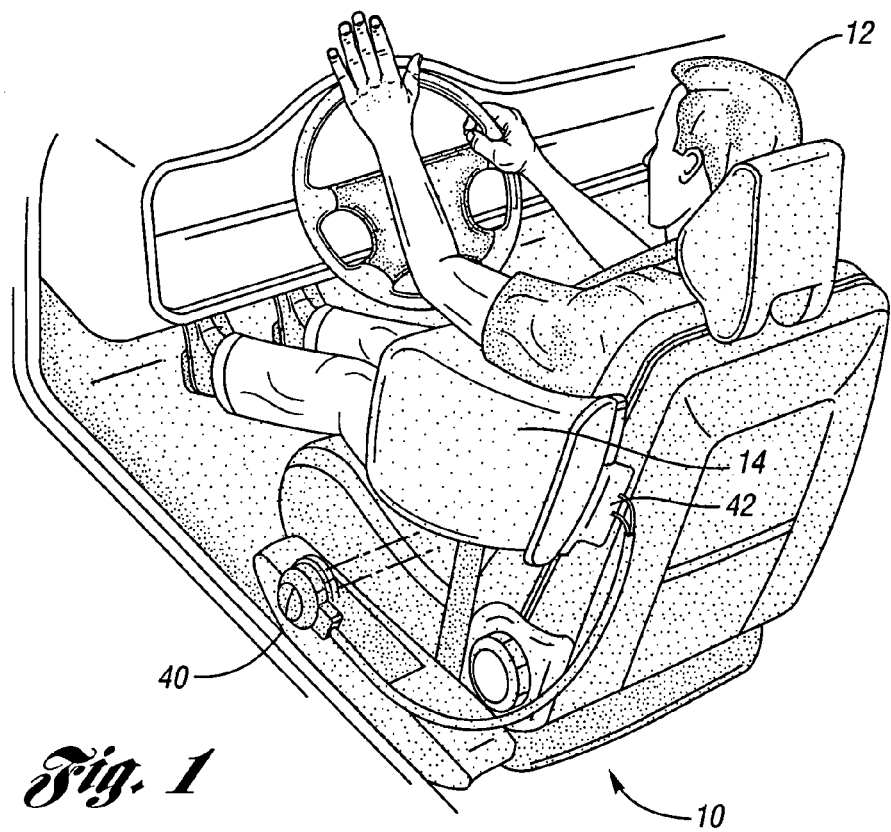
FIG. 1 depicts a portion of a vehicle in section along with a schematic depiction of a vehicle safety system according to an exemplary embodiment.

FIG. 1 illustrates a schematic depiction of the vehicle safety system 10 which is configured to protect vehicle occupants 12 in side impact crash. The vehicle safety system 10 functions to activate a protective device (such as an airbag 14) which protects the vehicle occupant 12. The vehicle safety system 10 is compatible with various automobiles including SUVs, trucks and cars such as the one schematically depicted in FIG. 1. The embodiment shown in FIG. 1 is exemplary only. The sensors and vehicle door disclosed herein are not limited for use with side impact type airbags. The sensor and vehicle door may be employed in combination with various safety systems providing input to a control unit (e.g., the vehicle control unit) for controlling operation of any number of protective devices. Some other examples include driver airbags, passenger airbags, side curtain airbags, seat belt pretensioners, seat belt retractors, and other occupant/pedestrian protection devices. An example of an alternative configuration of a vehicle safety system is disclosed in U.S. Pat. No. 6,976,705, entitled, "Passenger Safety Device", which is incorporated by reference herein in its entirety.

Figure 2:
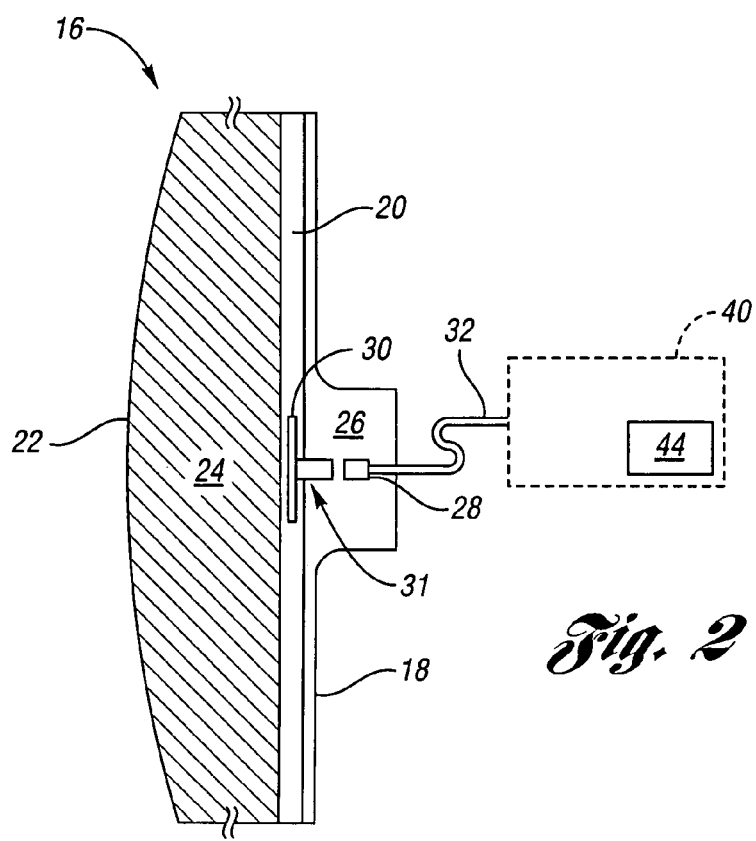
FIG. 2 schematically depicts a cross-section of an arrangement for integrating the sensor sensing portion with respect to the vehicle door according to an exemplary embodiment.

In the exemplary embodiment shown in FIGS. 1 and 2, the vehicle includes a door 16 having an interior portion 18, a door module 20 and an exterior portion 22. The interior and exterior portions 18 and 22 of the door 16 are separated by the door module 20. The area 24 between the exterior portion 22 of the door and the door module 20 defines the uncontrolled portion of the door cavity or the "wet side" of the door. The "dry side" of the door is defined as the area 26 between the door module 20 and the interior potion 18 of the door. The door module 20 may act as a barrier between the wet and dry sides of the door, and provides for various mounting locations for the sensor 31. The relative sizes of the various components of the door shown in FIG. 2 are merely exemplary and could be changed based on the components installed in the door structure.

The sensor 31 may include a sensor portion 30 which may comprise an electrode or conductor. The current flow in the sensing portion 30 may be monitored to determined whether the collision or crash is occurring. As shown in FIG. 2, the electrode portion 30 of the sensor 31 is integrated into the door module 20.

The sensor 31 shown in the drawings is exemplary only. Other types of vehicle electronics or sensors may be integrated into the door module 20. In addition to the collision or crash sensor components, the door module 20 may include and facilitate other main functional devices of the door such as, for example, audio speakers, volume controls, actuators for window adjusters and/or door locks, etc.

Integrating the sensing portion 30 within the door module 20 may reduce or eliminate the need for fasteners and further reduce the potential for leak paths to occur between the wet side and dry side of the vehicle door. Electrical connections 32 are established on the dry side of the door, therefore, a sealer may not be required. The door module 20 is further configured to mount and guide various electronic components internal to the vehicle door. For example, wiring and servo motors typically utilized to power the adjustment of passenger windows or door locks may be coupled to the door module 20 and packaged within the vehicle door 16. The door module 20 is preferably composed of a easily formable, light weight, electrically insulated material such as a polymer which may be injection molded into a plethora of cavities having various shapes and designs to be compatible with vehicle doors on different styles of automobiles.

Figure 3:
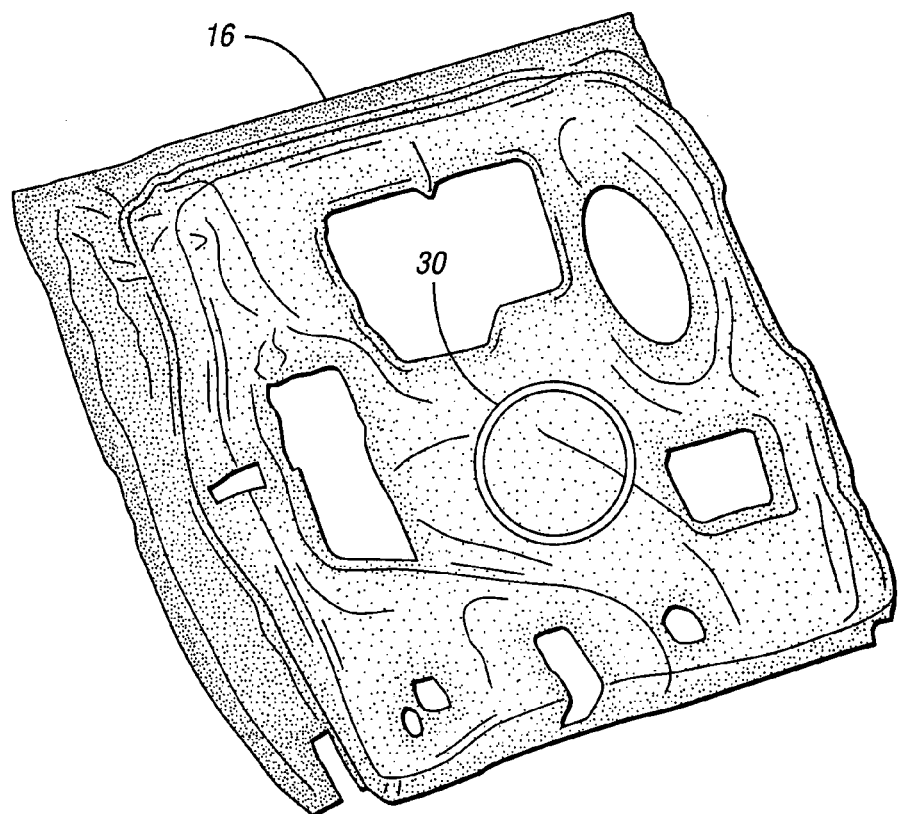
FIG. 3 depicts the sensor sensing portion mounted with respect to the vehicle door according to an exemplary embodiment.

As shown in FIG. 3, the door module 20, may be manufactured separately from the door structure and installed in the door as a separate compact module. Also, the door module 20 may include the coil, which is the sensing portion 30 of the vehicle sensor 31. The sensing portion 30 may be integrated into the door module and arranged with a connecting portion available for connection to a wire harness 28 or the like (as shown in FIG. 2). As mentioned above, the door module 20 shown in FIG. 3 may be manufactured to include various other integrated electrical and/or mechanical components typically found in a vehicle door. The sensing portion 30 shown in FIG. 3 has a generally circular shape, however, as explained further below, other configurations and shapes may be used as appropriate based on the type of vehicle that the door module is installed within.

Figure 5:
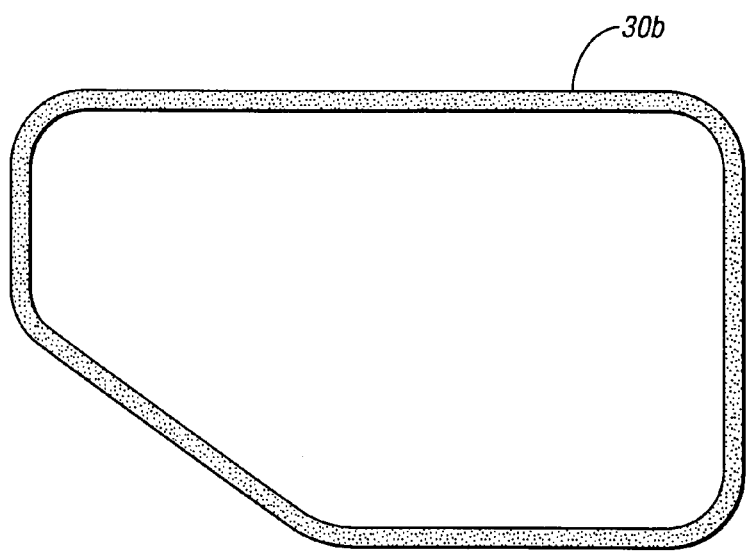
Figure 6:
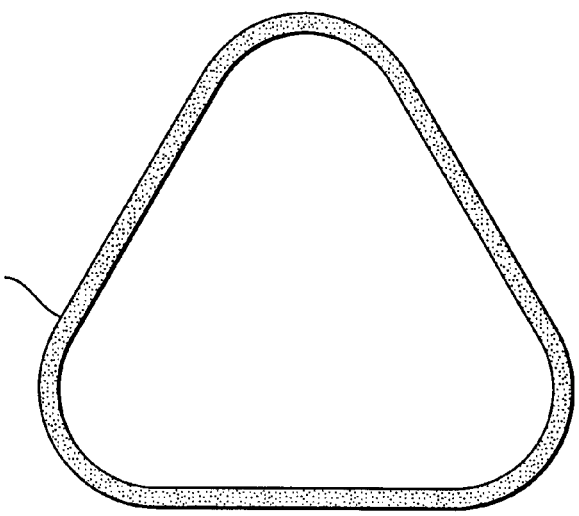
Figure 7:
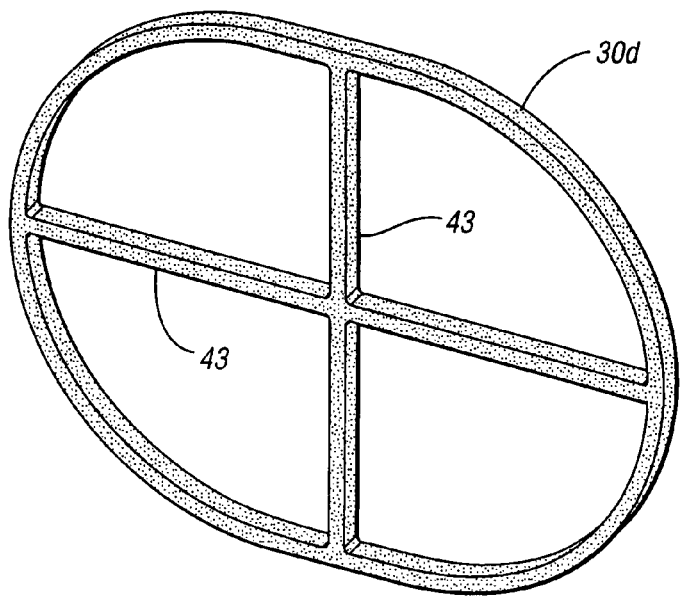

Various configurations of the sensing coil (e.g., 30a-d) of the sensor 31 may be integrated into the door module 20. For example, as illustrated in the exemplary embodiments of FIGS. 4-7, the sensing portion 30 may be configured to define different shapes having various spans of coverage. In the exemplary embodiments of FIGS. 4 and 7, the sensing portion 30a and 30d are configured to define an oval shape with cross-members 43 extending therein, which may prove more appropriate for vehicle doors used in midsized cars and small SUVs. In the exemplary embodiment of FIG. 5, the sensing portion 30b is configured to define a polygon shape, which may be preferred for use in doors found in trucks and full-sized SUVs. In the exemplary embodiment of FIG. 6, the sensing portion 30c is configured to define a triangular shape, which may be preferred for use in a vehicle door used in compact cars and performance vehicles. Other configurations may be utilized to conform to the intended coverage area and packaging considerations of various types of automobiles.

In the illustrated exemplary embodiment of FIGS. 2-7, the sensor 31 is coil 30 configured to generate a magnetic flux. The sensing portion 30 is integrated and/or mounted with respect to the vehicle door 16 so that displacement (or deformation) of the exterior portion of the vehicle door beyond a threshold (or predetermined condition) triggers the activation of a protective device, such as, for example, an airbag 14. The sensing portion 30 is electrically insulated with respect to the vehicle door 16. As the current travels through the sensing portion 30 an electromagnetic flux is generated. The exterior portion 22 of the vehicle door 16 typically provides the path of least reluctance for the magnetic flux generated by the sensing coil 30. Mechanical stresses within the exterior portion 22 change the reluctance within the vehicle door 16 such that mechanical stresses against the exterior portion of the door will change the magnetic flux. In this arrangement, the vehicle safety system 10 is an electromechanical system that uses magnetic fields to sense the relative motion and deformation of the vehicle door 16 and nearby metal during a crash. An oscillating magnetic field is generated by the coil 30 via a transmitter portion of a transceiver block of the vehicle controller 40.

Exemplary operation of the sensor is described in U.S. Pat. Nos. 7,209,844, 6,433,688 and 6,407,660, all of which are commonly assigned and herein incorporated by reference in their entirety.

When the sensing portion 30 is insert molded into the door module 20 complexities regarding the proper location of the sensing portion with respect to the door module are significantly reduced. Moreover, the structural connection between the door module 20 and the sensing portion 30 is significantly strengthened by the integration of the sensing portion therein.

Figure 9:
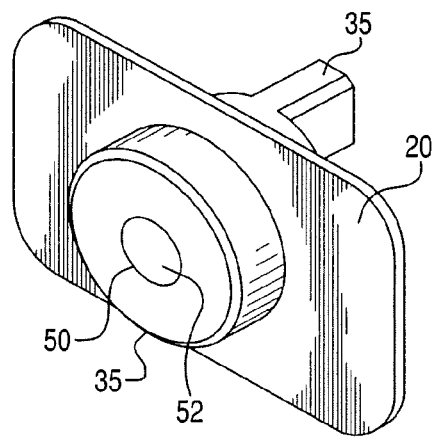
FIG. 9 schematically depicts a fastener integrated into the door module according to an exemplary embodiment.

As shown in FIG. 9, the sensor 34 need not be limited to an Electromagnetic sensor employing a conductor or electrode (e.g. shown in FIGS. 4-7). Instead, the sensor 34 may be any one of a plurality of sensors known within the art operative to detect a vehicle collision or crash (e.g., an electromagnetic sensor, accelerometer, strain gauge, etcetera).

For example, a strain gage may be integrated into the door module. Changes in mechanical stresses applied to the strain gage sensing portion of the sensor may be sensed and used to control the deployment of an airbag or other safety device. In yet another alternative embodiment, the sensor may include an accelerometer configured to sense a change in force or speed of the door module 20 with respect to time. Changes in the sensed acceleration may be used to control the deployment of a safety device. As described below, in such an arrangement the housing enclosing the accelerometer (such as shown for example in FIG. 8), may be integrated into the door module.

Figure 4:
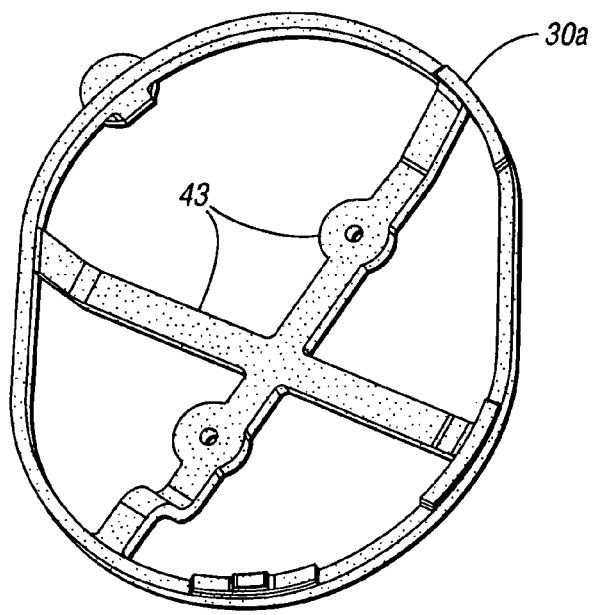
FIGS. 4-7 schematically depict configurations for the sensing portion according to several exemplary embodiments.
Figure 8:
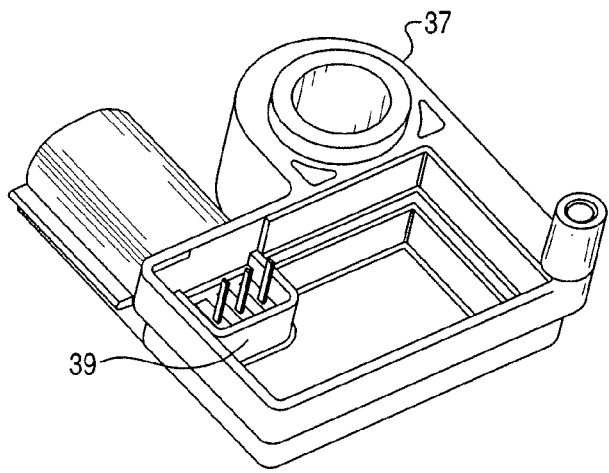
FIG. 8 depicts one alternative exemplary sensor according to one exemplary embodiment.

As an alternative to mounting a portion of the sensor or sensing structure in the molded door module, a fastener or other sensor mounting structure may be integrated into the door module. For example, as shown in FIGS. 4 and 8, the sensor may include a plurality of mounting structures 43, which may be integrated into or attached to the door module using locator posts or fasteners molded into the door module. During assembly of the door (and or the vehicle itself), the sensor could be easily connected to the integrated mounting structure using a fastener or the like. In such an arrangement, an assembly process is simplified because the sensor may be easily connected to the mounting structure. For example, in FIG. 9, the door module may include an opening or recess 50 into or through which a mounting extension 52 of a sensing portion may be inserted. As mentioned above, the sensing portion may include any of a number of suitable sensor types such as, for example, coil, accelerometers or the like.

Furthermore, according to another embodiment, a sensor module 37 (shown in FIG. 8) such as may be typically used to house a semiconductor type accelerometer, may be integrated into the door module in a manner allowing for simple connection between an exposed portion of the external connectors 39 that mates with connector 32 and a wire harness 28 positioned to carry a signal to and/or from a control mounted elsewhere in the vehicle.

The various embodiments described herein disclose integrating various components of a sensor and/or sensor assembly into a molded door module such as, for example, an electrode type sensing portion, a sensor housing, a sensor mounting structure or other components of the sensor. Such an arrangement facilitates assembly of the door by possibly only requiring a simple connection between the integrated sensor component and the remaining portion of the sensing system during assembly of the vehicle.

As shown in FIG. 2, the sensor system may include a controller 40. Although shown with respect to an electromagnetic type sensor, the wire harness 28 and controller 40 arrangement may be employed with various other types sensors described herein and well known to those in the art. The controller 40 is configured to send an activation or fire signal to an airbag module, inflator or other component to initiate the deployment of a safety device. For example, the controller may send a signal to an initiator of an airbag inflator 42 (see FIG. 1) to cause the generation of gas within the cavity of the airbag.

The controller 40 is typically coupled to a sensor 31 via a wire harness 28 and is configured to determine the existence of a predetermined condition indicative of an impact or crash involving the vehicle. The controller 40 includes a microprocessor 44. The controller 40 is configured to receive or request a signal from the sensor 31. For example, when utilizing an electromagnetic type sensor, the sensing portion may sense a change in the reluctance of the exterior portion 22 of the door 16 due to the occurrence of a side impact crash. A signal from the sensing portion may be provided to the controller so that the controller can determine whether deployment of an airbag or other safety device is required.

Figure 10A:
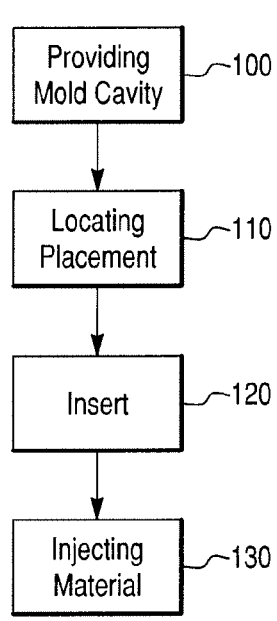
FIG. 10a depicts a flow chart for injection molding the sensor into the vehicle door according to an exemplary embodiment.
Figure 10B:
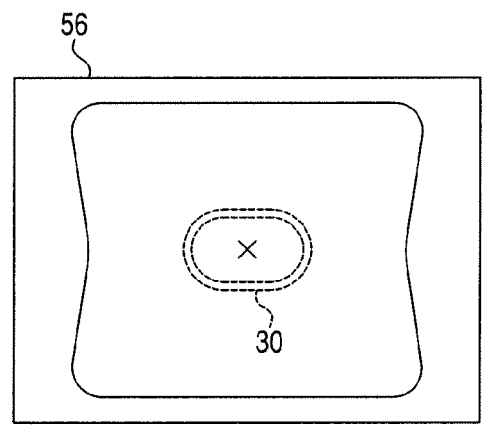
FIG. 10b schematically depicts a mold cavity or die for manufacturing the door module according to an exemplary embodiment.

A method of manufacturing a vehicle door structure with vehicle safety system is disclosed herein and illustrated in FIGS. 10a-b. The method comprises: providing a mold cavity or die 56 configured to define the door module 100; locating a placement for inserting the sensing portion (or other sensor component) into the mold cavity 110; placing the sensor components to be integrated into the door module into the mold cavity 120; and injecting material (typically polymer material) into the cavity 130. The cured material forms a door module.

As shown in FIG. 10b, the sensing portion 30 may be placed in the mold cavity 56. The door module 20 may be removed from the cavity 56 and the door module 20 may be coupled to the exterior portion 22 of the vehicle door. The sensing portion 30 may further be coupled to the remaining portion of the sensor assembly 31 such as, for example, a wire harness 28 connected to a controller 40.

The placement for the sensing portion may be determined based on the required performance of the vehicle safety system 10. Each sensing portion configuration 30a-d may have a different prescribed location for optimal performance (e.g., X of FIG. 10b). The disclosed fabrication method permits placement of the integrated sensor component (e.g., the sensing portion 30) prior to installation of the door thereby ensuring an accurate placement of the sensor. Other door components can also be suitably arranged during the molding process thereby eliminating the likelihood of alignment errors during manufacturing of the vehicle.

Figure 11A:
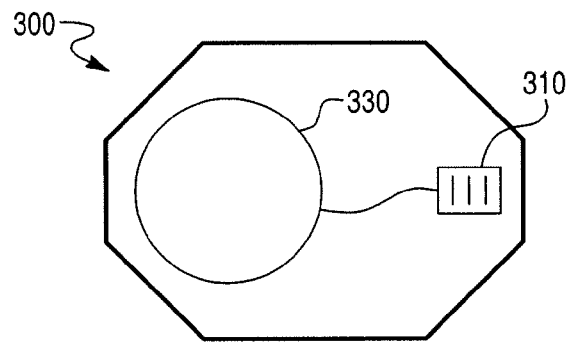
FIG. 11a depicts a transducer assembly according to an exemplary embodiment.
Figure 11B:
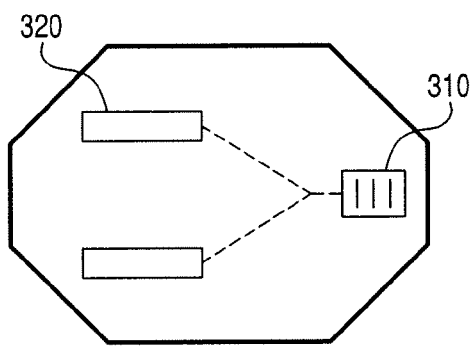
FIG. 11b depicts a transducer assembly according to another exemplary embodiment.
Figure 11C:
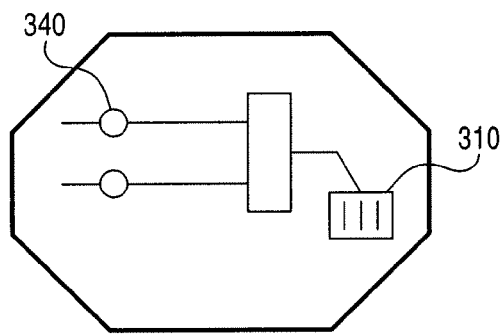
FIG. 11c depicts a transducer assembly according to another exemplary embodiment.
Figure 12:
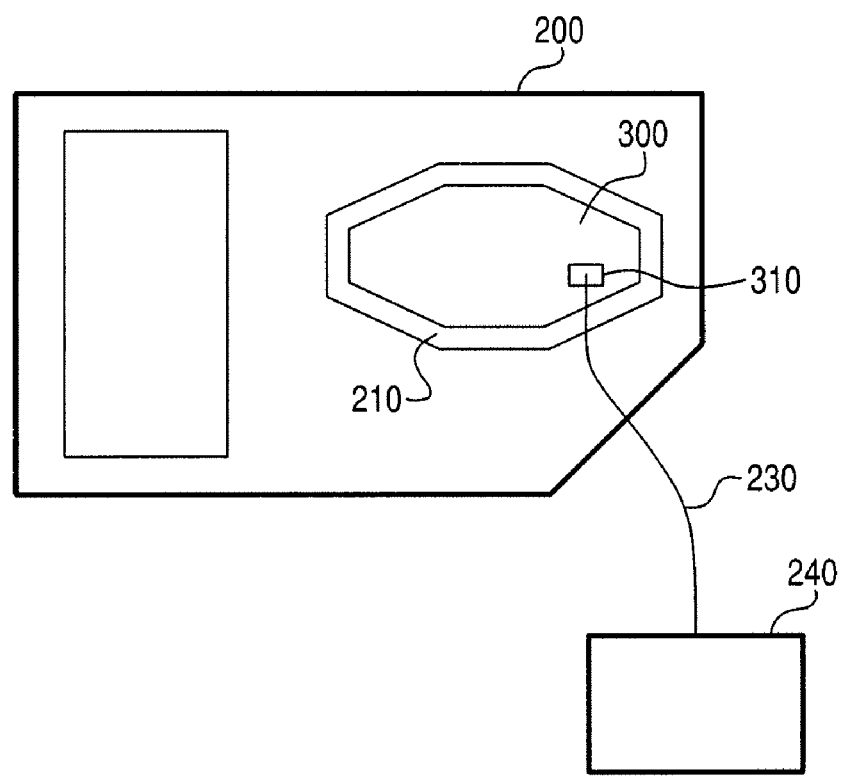
FIG. 12 depicts a transducer assembly mounted in a structure of a door arrangement according to an exemplary embodiment.

An alternative embodiment of the present invention is disclosed in FIGS. 11a, 11b, 11c, and 12. As described above, certain sensor components may be integrated into a complete door module along with other electrical and mechanical components of a door structure. According to an alternative embodiment of the invention, certain sensor components are integrated into a transducer assembly 300 that is configured to mount in a preexisting cavity or structure 210 of a conventional door arrangement 200. As shown in FIG. 12, the transducer assembly is configured to a specifically shaped component for easy installation. The transducer assembly 300 includes a connector 310 for connection to a signal carrying device (e.g., wire harness 230) configured to provide a connection between a controller 240 and the transducer assembly.

As shown in the various exemplary embodiments disclosed in FIGS. 11a-11c, the transducer assembly 300 may include various sensor transducers, electrodes or coils packaged in a specifically shaped arrangement. The transducer assembly may be an insert molded part or, according to other embodiments, may be a printed assembly or the like. As shown in FIG. 11a, the transducer assembly 300 may include a sensing coil 330 or electrode. FIG. 11b discloses a transducer assembly containing a pair of semiconductor type accelerometers 320 connected to a terminal output device 310. FIG. 11c discloses, by way of example, a pair of strain gage type transducers 340 connected to the output terminal 310. FIGS. 11a-11c are exemplary of a transducer assembly configured to be prefabricated to be easily assembled within an existing door structure.

While the exemplary embodiments illustrated in the Figures and described above are presently preferred, it should be understood that these embodiments are offered by way of example only. For example, the teachings herein can be applied to any vehicle safety system and is not limited to side impact vehicle safety systems in vehicles. Also, integrating the sensor into the vehicle door structure may be accomplished by other processes and is not limited to injection molding. Accordingly, the present vehicle safety system is not limited to a particular embodiment, but extends to various modifications that nevertheless fall within the scope of the appended claims.

What is claimed is:

1. A vehicle safety system comprising:
   a door including a door module that separates an interior of the door into two cavities;
   a sensor including a sensing portion configured to detect a vehicle characteristic, wherein the sensing portion is integrated into the door module and wherein the sensing portion is electrically insulated with respect to the vehicle door; and
   a controller operatively connected to the sensor and configured to receive a signal from the sensor and to activate a protective device when a measurement of the signal received from the sensor indicates the occurrence of a predetermined condition, and
   a protective device, activated by the controller, for protecting the occupant.

2. The safety system of claim 1, wherein the door module comprises a molded plastic.

3. The safety system of claim 1, wherein the sensor is an electromagnetic sensor and the sensing portion includes a coil operative to generate a magnetic flux.

4. The safety system of claim 3, wherein the sensor is configured to function with an exterior portion of the vehicle door so that the exterior portion of the vehicle door provides a path of reluctance for the magnetic flux.

5. The safety system of claim 4, wherein the sensing portion is configured to detect a change in the reluctance associated with deformation of the vehicle door.

6. The safety system of claim 1, wherein the sensing portion is integrated into the door module via injection molding.

7. The safety system of claim 1, wherein the door module comprises an electrically insulated polymeric material.

8. The safety system of claim 1, wherein the controller includes a microprocessor configured to determine whether to activate the protective device.

9. The safety system of claim 1, wherein the protective device is an air bag.

10. A door including a door module comprising a polymeric material including an embedded coil forming a sensing portion of a vehicle sensor configured to detect a vehicle characteristic, wherein the coil is configured to generate a magnetic field in the vicinity of the door module wherein the sensor is configured to detect the vehicle characteristic by sensing the change in current through the coil.

11. The door of claim 10, wherein the coil is configured to induce eddy currents in an adjacent conductive vehicle structure and wherein the current through the electrode is indicative of the deformation of the vehicle structure due to a crash involving the vehicle.

* * * * *